Dec. 29, 1931.  W. L. HANLEY, JR  1,838,672
TUNNEL KILN
Filed June 7, 1929  9 Sheets-Sheet 3
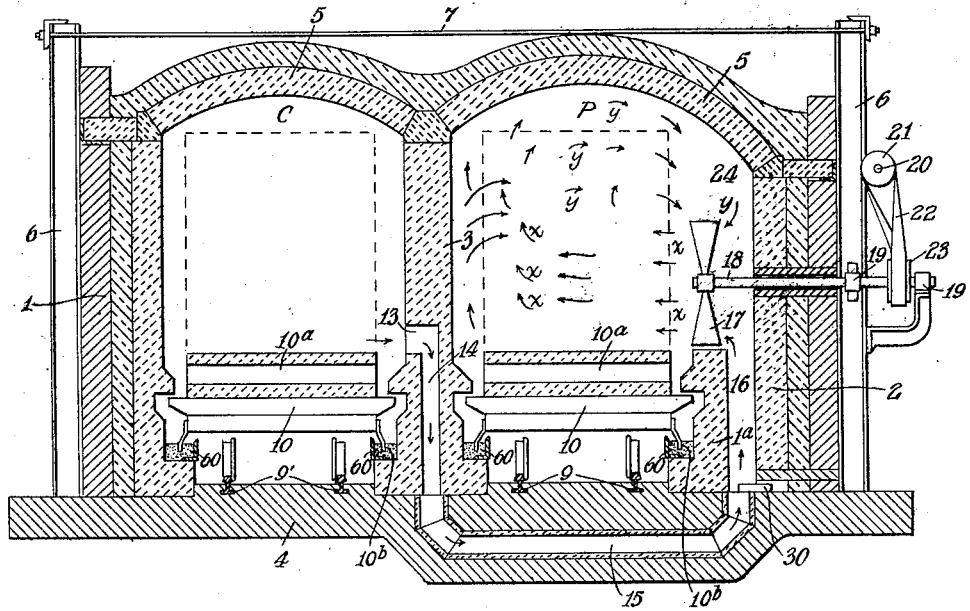
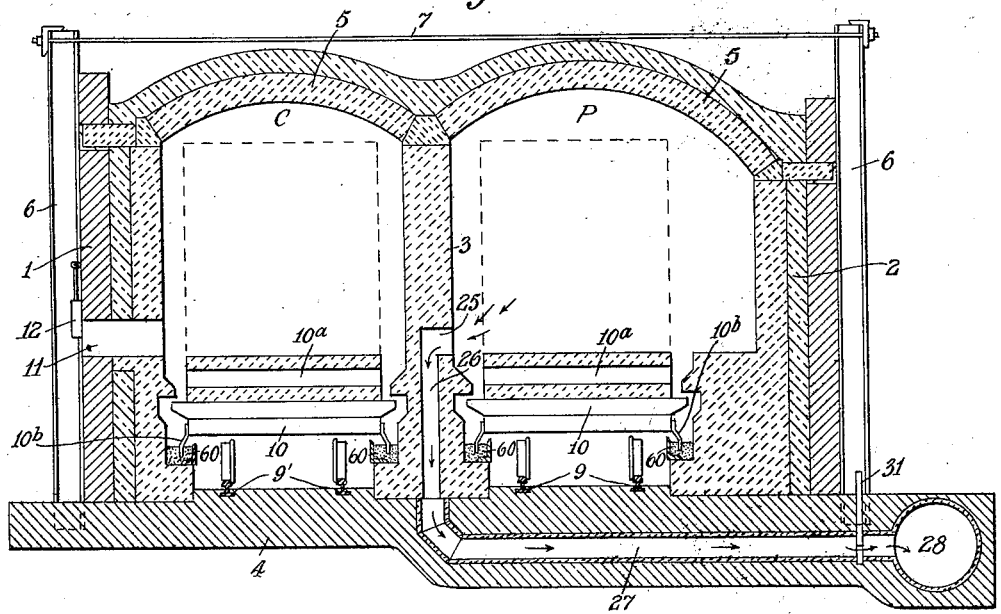
INVENTOR
William L. Hanley, Jr.
BY
Louis Prevost Whitaker
ATTORNEY Dec. 29, 1931.  W. L. HANLEY, JR  1,838,672
TUNNEL KILN
Filed June 7, 1929  9 Sheets-Sheet 4
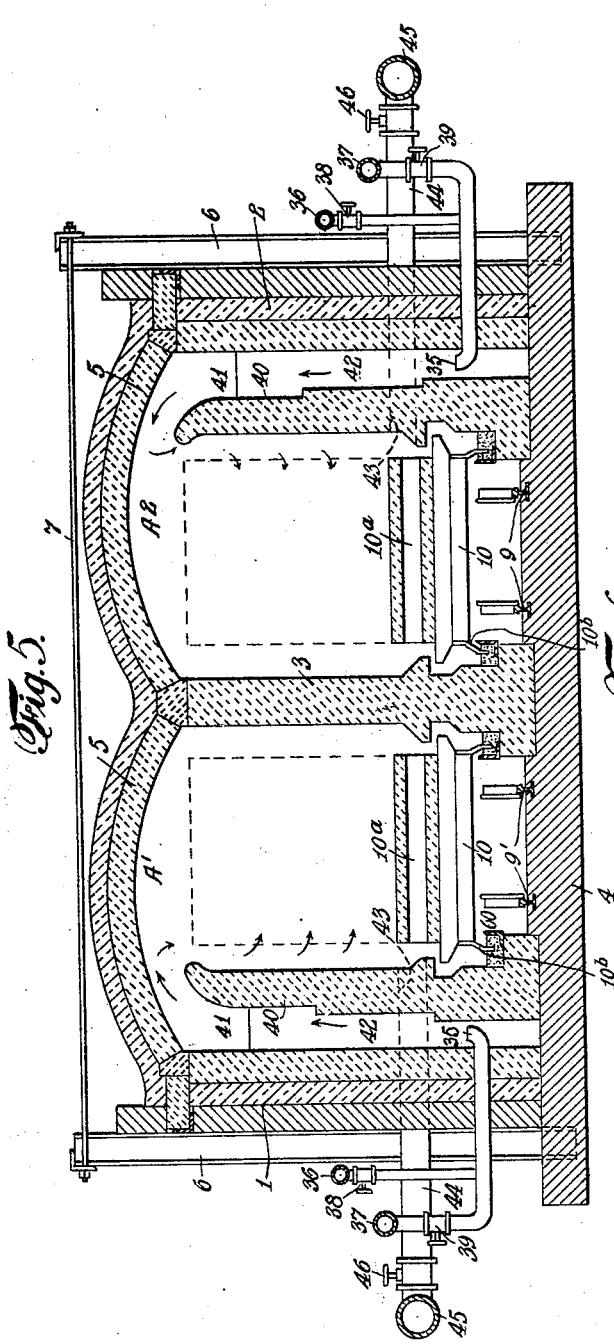
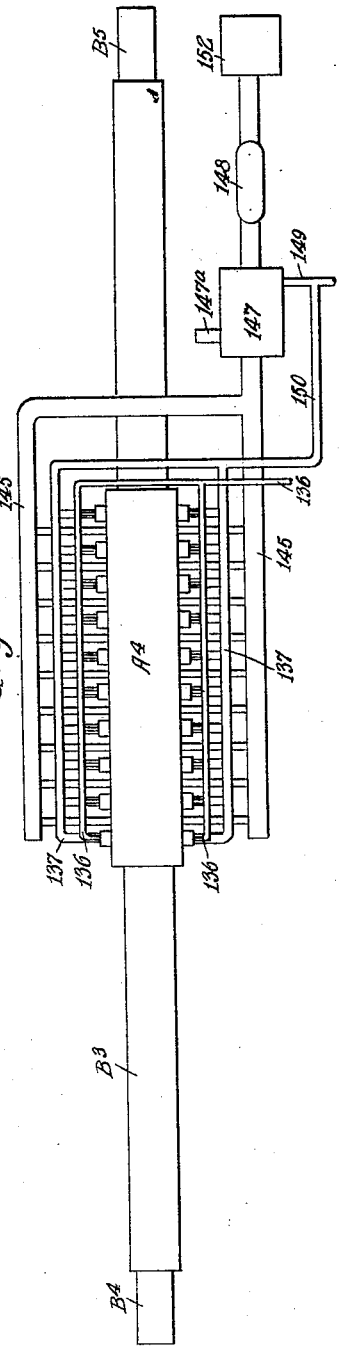
INVENTOR
William L. Hanley Jr
BY
Louis Prevost Whittaker
ATTORNEY

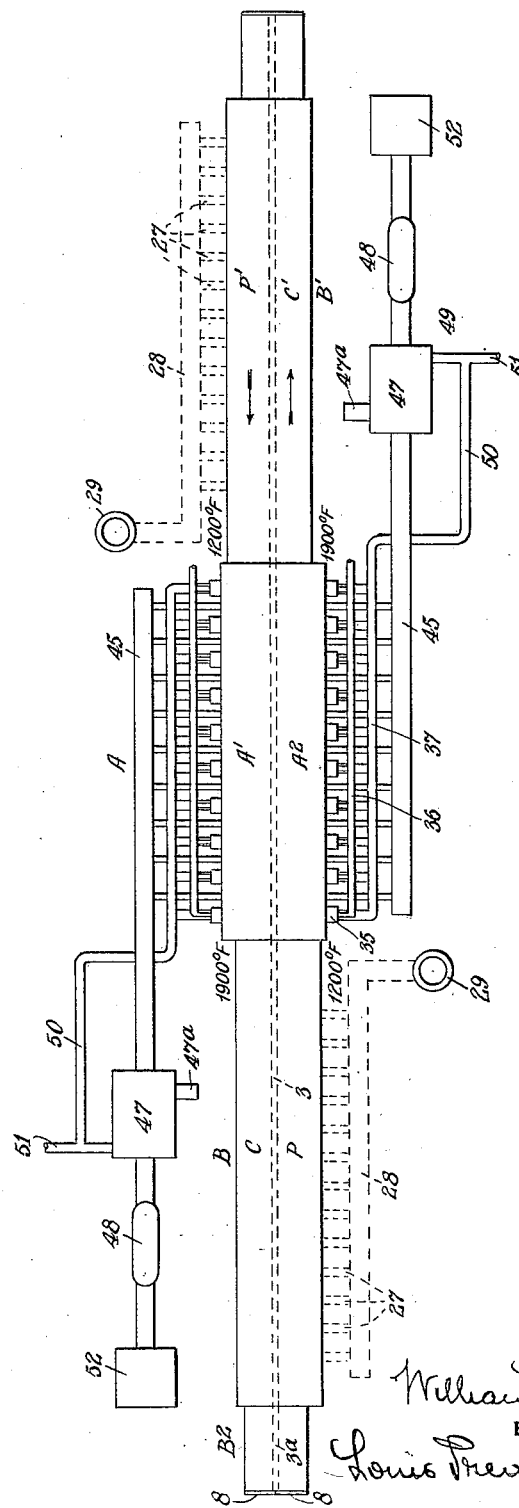

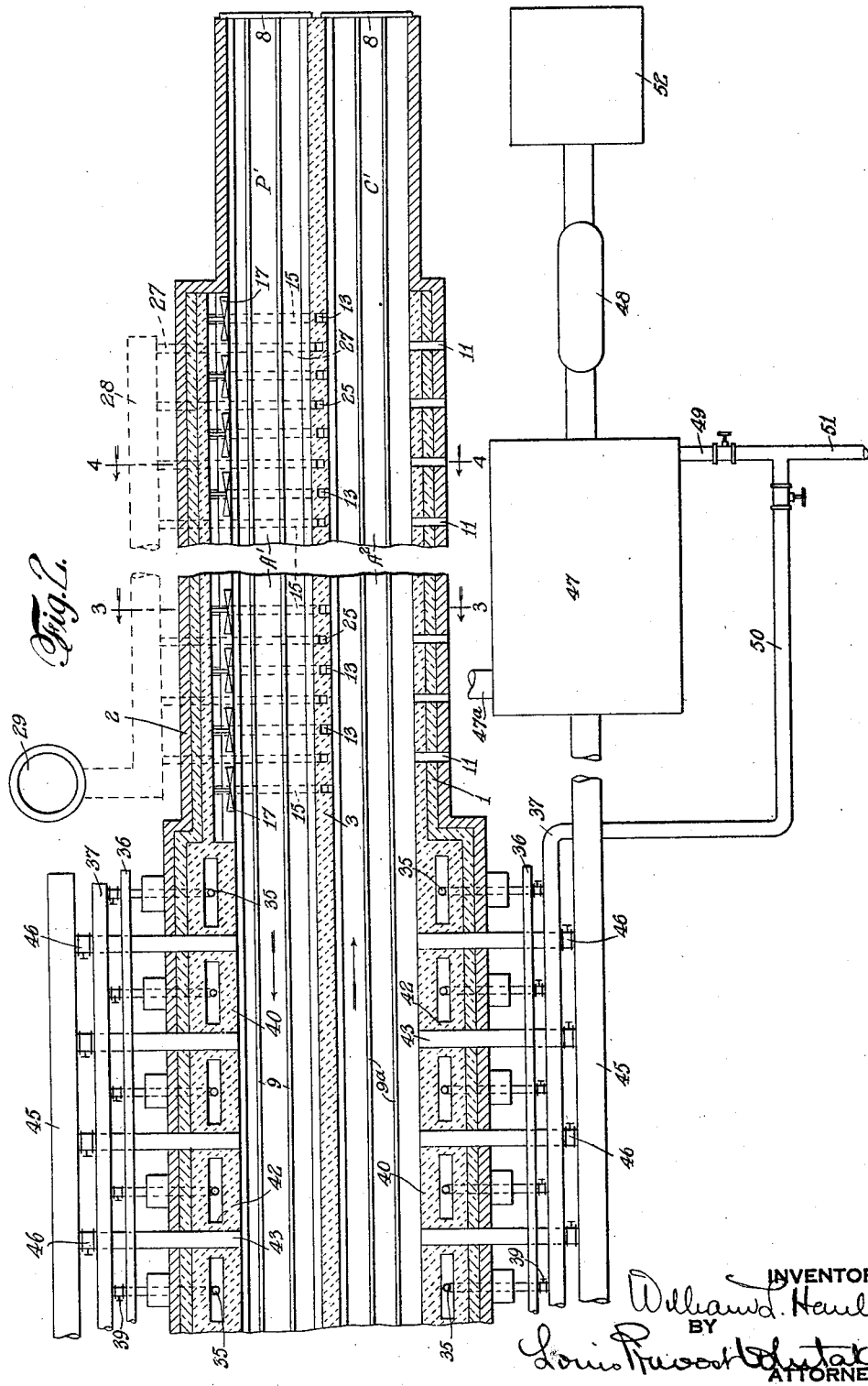

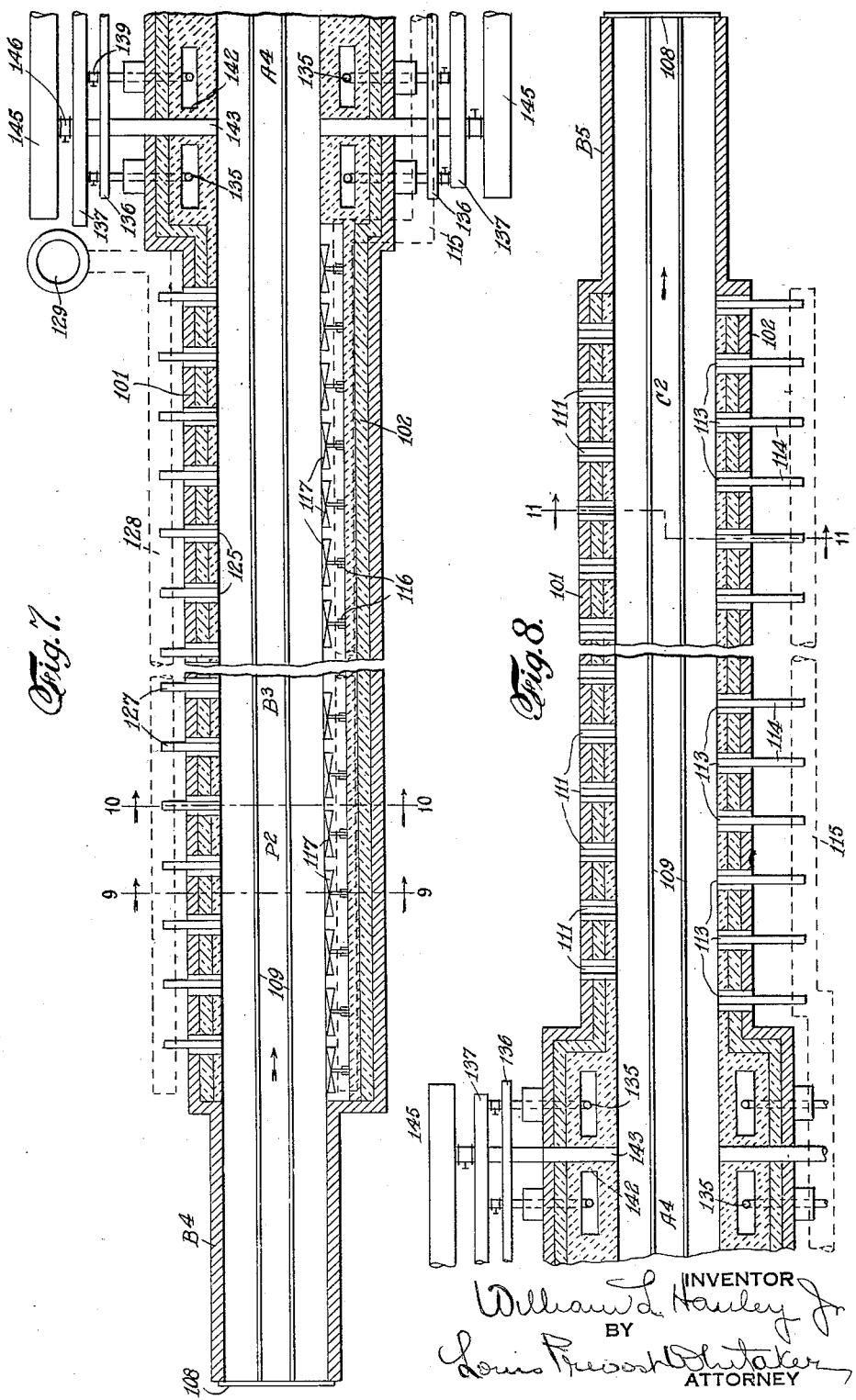

Dec. 29, 1931.  W. L. HANLEY, JR  1,838,672
TUNNEL KILN
Filed June 7, 1929   9 Sheets-Sheet 6
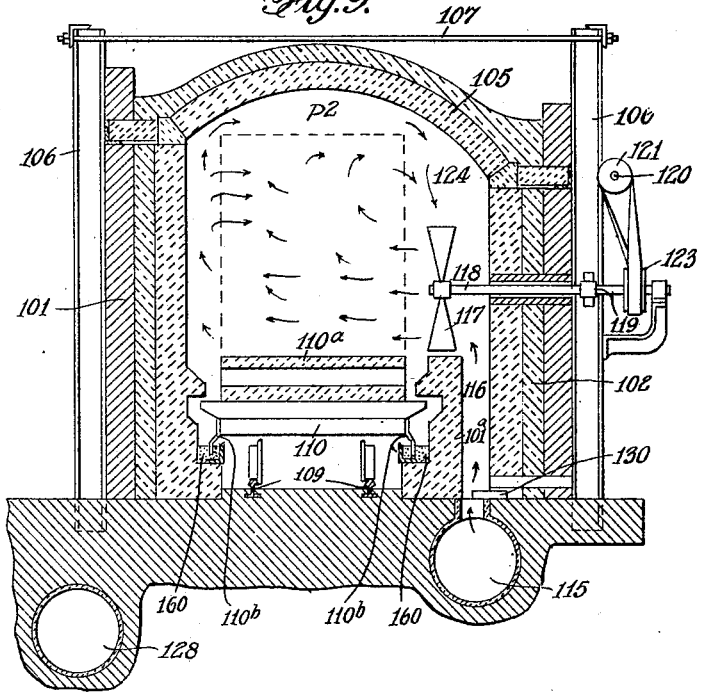
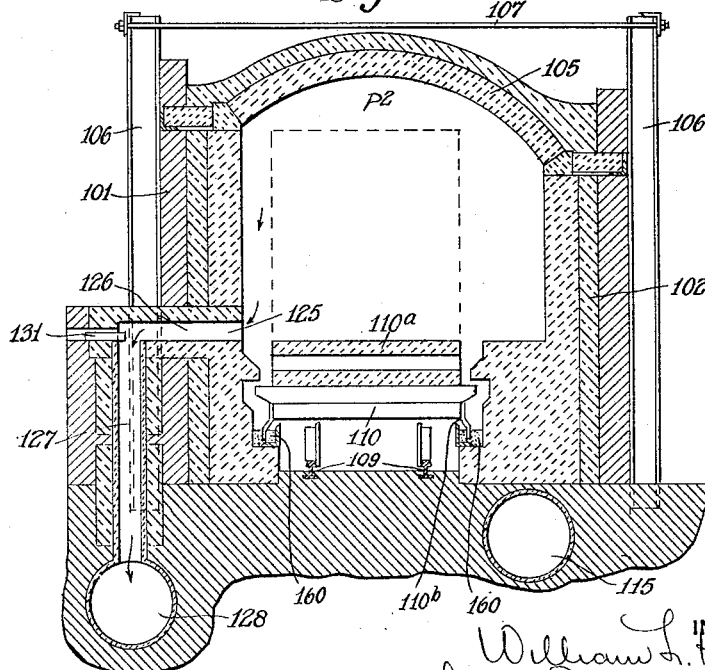
INVENTOR
William L. Hanley Jr
BY
Louis Prevost Whitaker
ATTORNEY Dec. 29, 1931.  W. L. HANLEY, JR  1,838,672
TUNNEL KILN
Filed June 7, 1929   9 Sheets-Sheet 7
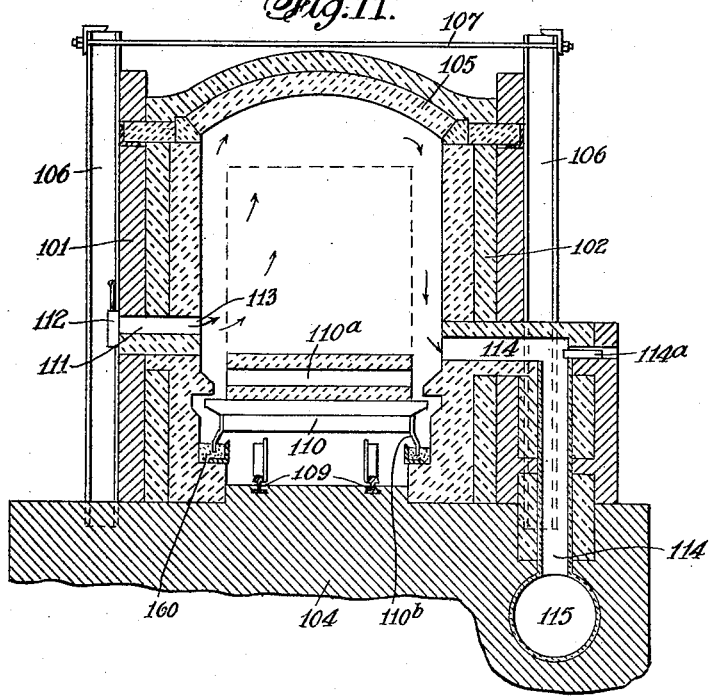
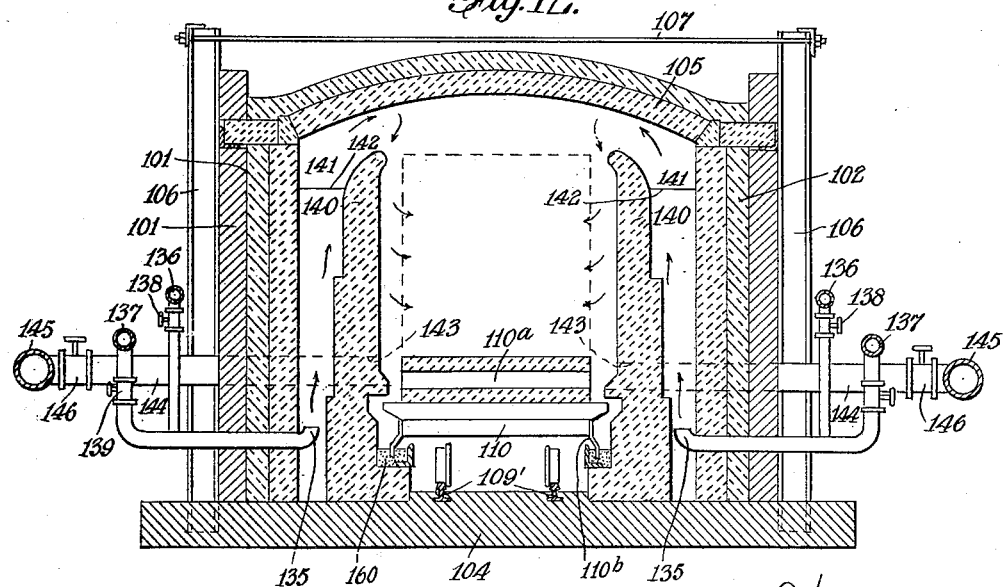

Dec. 29, 1931.  W. L. HANLEY, JR  1,838,672
TUNNEL KILN
Filed June 7, 1929  9 Sheets-Sheet 8
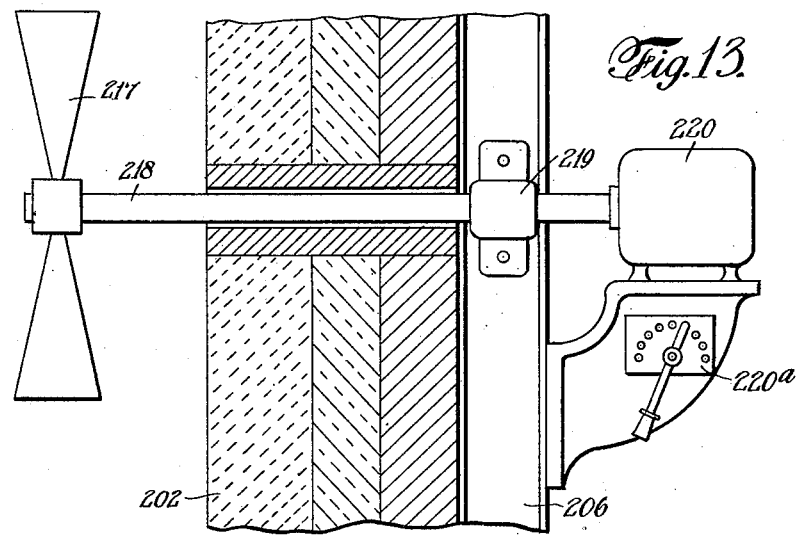
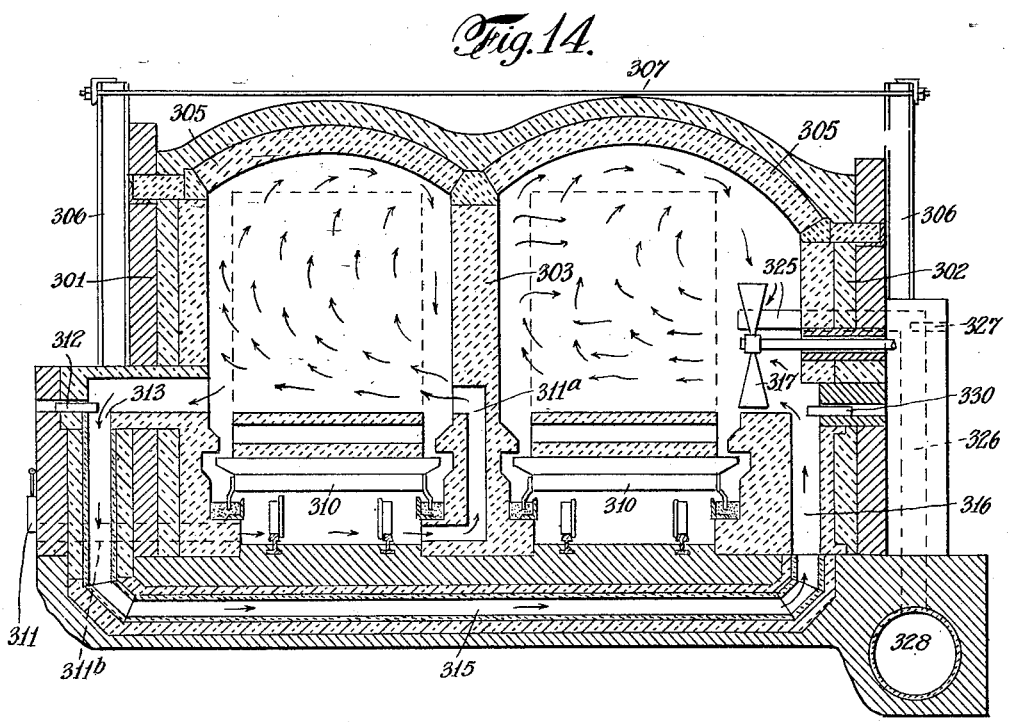

Dec. 29, 1931.    W. L. HANLEY, JR    1,838,672
TUNNEL KILN
Filed June 7, 1929    9 Sheets-Sheet 9
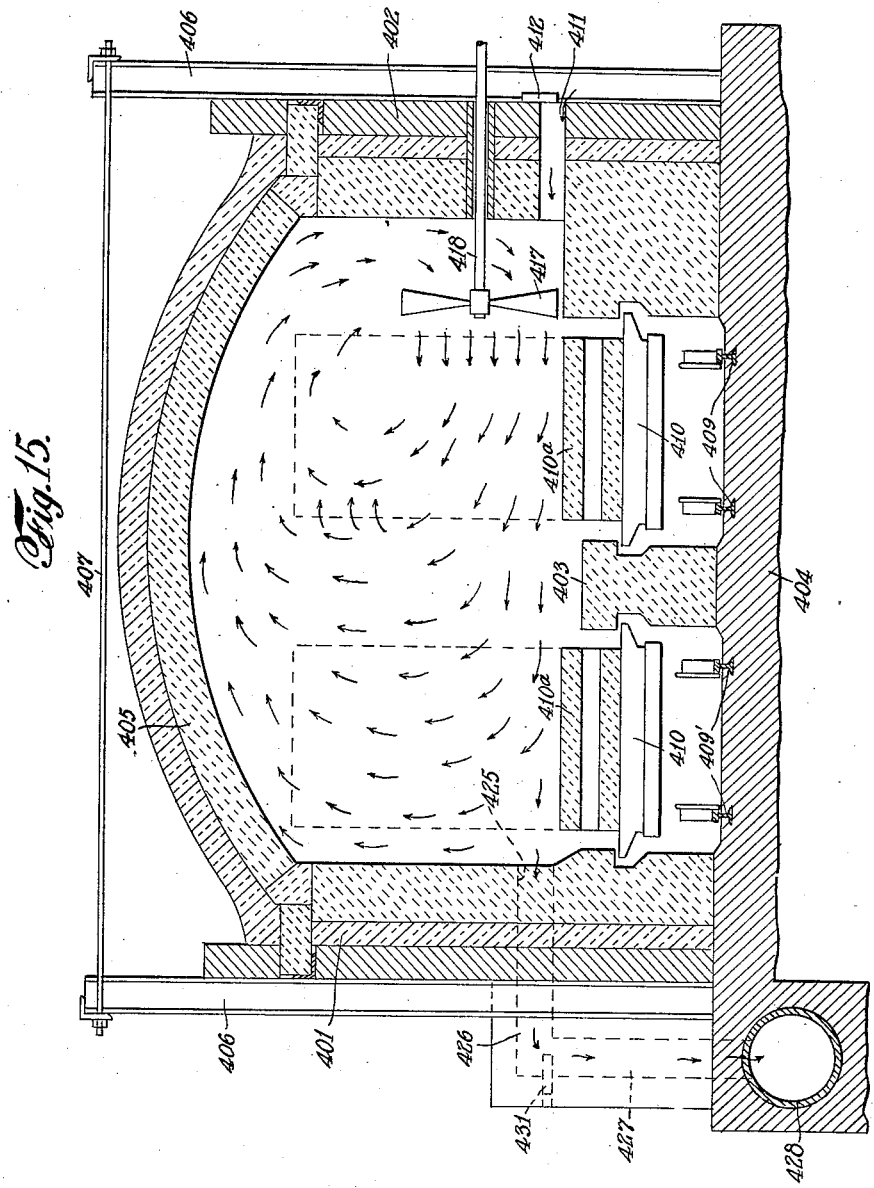

Patented Dec. 29, 1931

1,838,672

UNITED STATES PATENT OFFICE

WILLIAM LEE HANLEY, JR., OF BRADFORD, PENNSYLVANIA

TUNNEL KILN

Application filed June 7, 1929. Serial No. 369,090.

My invention consists in the novel features hereinafter described, reference being had to the accompanying drawings which illustrate several embodiments of the invention selected by me for purposes of illustration, and the said invention is fully disclosed in the following description and claims.

My invention is an improvement in tunnel kilns and is equally applicable to single tunnel kilns and twin tunnel kilns, and while it is particularly desirable and efficacious in the construction of tunnel kilns for burning bricks and other coarse clay products, it may be advantageously employed for other purposes.

In carrying my present invention into effect, I cause the ware when it enters the kiln to pass through a preliminary treatment zone which I term the "preheating zone", from which it passes through a centrally located firing zone, on leaving which it passes through a cooling zone. It will be understood that in accordance with usual practice the bricks or other coarse clay products as they come from the forming machine are treated in a suitable drier for the elimination of the greater part of the occluded water, and that after leaving the drier they are immediately introduced into the preheating zone of the tunnel kiln, in which they arrive at a temperature approximately 300° F. In the preheating zone the ware is raised in temperature from about 300° F. to 1200° F. or 1300° F., at which temperature it enters the burning zone where it is raised to approximately 1900° F., thence passing into the cooling zone where it is cooled from approximately 1900° F., down to 500° F. or 600° F. In the preheating of the ware it is necessary not only to raise the temperature of the ware, but in addition, to provide a sufficient quantity of oxygen for the oxidation of sulphur and other oxidizable matter in the clay, and it is essential to the successful operation of preheating that the fumes and vapors resulting from this chemical action shall be removed from the preheating zone as rapidly as they are formed in order to prevent scumming or discoloration of the ware.

In carrying my invention into effect, I provide for the admission at more or less closely related points longitudinally of the preheating zone of highly heated fresh air, means being provided for regulating the amount of heated air admitted at any point longitudinally thereof, so that any desired range of temperatures generally termed a "temperature curve" may be secured and maintained. I further provide mechanical means within the preheating zone located at closely adjacent points longitudinally thereof, preferably in the form of a longitudinal series of rotary fans, located at one side of the path of the ware, on the transferring means or cars, and preferably near the bottom portions of the stacks of bricks or other products on said transferring means, whereby the heated air will be forcibly circulated transversely through the lower portion of the stacks of ware from one side of the preheating zone to the other, the fans or other air moving means being located adjacent to the point at which the heated air enters the preheating zone and having larger capacity than is necessary to insure the drawing in of the required amounts of heated air, thereby effecting a recirculation of this heated air within the preheating zone and forcibly ejecting it therefrom through suitable outlet ports provided usually on the opposite side of the preheating zone from the fans. By this means I am able to obtain a vigorous circulation of the heated air through and around the bricks or other products, the fresh air from the fans passing between and around the ware in the lower layers of ware on the car, in a direction transversely of the kiln and passing in the reverse direction between and around the ware in the upper layers and over the top of the ware, preventing the accumulation of stagnant gases adjacent to the surfaces of the ware, and enabling the carbon and sulphur and other oxidizable matter to be eliminated with much greater rapidity than can be accomplished where this vigorous and sweeping circulation and recirculation is not provided. This is a matter of great importance in the construction and operation of tunnel kilns, as it enables me to materially shorten the length of the preheating zone thereof, and reducing the cost of the kiln accordingly. It will be noted that construction does not merely circulate the atmosphere of the kiln or zone, but provides for continuously introducing fresh air for oxidation and the continuous elimination of the air in the kiln or zone, together with the gases and vapors evolved in the preheating and oxidizing of the ware, thus efficiently removing sulphur, carbon and other oxidizable and vaporizable materials from the ware.

The heated air for use in the preheating zone as before described is preferably obtained, in accordance with my invention, by admitting fresh air at closely related points longitudinally of the cooling zones of the kiln under the control of suitable regulating means or dampers at each of said points, which is heated by contact with the fired ware moving through the cooling zone from the firing zone, and is then withdrawn from the cooling zone at separated points longitudinally of the cooling zone by the fans or other air forcing means in the preheating zone, the amount of air withdrawn from the cooling zone at each of said longitudinally disposed points and admitted to the cooling zone being under regulation of the regulating means or dampers previously referred to, so that the heat of the fired ware is conserved and used for preheating, oxidizing and water-smoking the ware, and the range of decreasing temperatures in the cooling zone, at different points longitudinally thereof, represented by a cooling curve can be regulated very accurately to give any desired cooling curve. It will follow, of course, that the total amount of heat units taken out of the cooling zone will always equal the total amount of heat delivered into the preheating zone less radiation and conduction losses, but by means of the regulating devices which control the admission of cool air to the cooling zone and the admission of heated air therefrom to the preheating zone in an entirely independent manner, the desired heat curve can be maintained in the preheating zone and any desired cooling curve can be maintained in the cooling zone, and these heating and cooling curves can be independently controlled and varied at will. As a result of this arrangement I am also able to reduce the length of the cooling zone and still obtain efficient cooling accompanied by the heating of the necessary air for the preheating zone.

The firing zone of my improved kiln may be of any type which will permit and not interfere with the operation previously indicated with respect to the heating and cooling zones. I prefer to employ a firing zone in which the ware is directly fired, that is to say comes directly into contact with the products of combustion, which however must be prevented from entering either the preheating or the cooling zone, so that there will be practically no end flow of the products of combustion from the firing zone in either direction.

My invention also includes the novel features of construction and combination of parts hereinafter described and particularly pointed out in the claims.

In the accompanying drawings in which I have shown several embodiments of my invention for purposes of illustration, Fig. 1 is a diagrammatic plan view of a twin tunnel kiln embodying my present invention.

Fig. 2 is an enlarged horizontal section partly broken away of one end of the kiln shown in Fig. 1, containing a preheating zone for one line of cars and a cooling zone for the other line of cars of ware arranged side by side.

Fig. 3 represents an enlarged transverse vertical sectional view taken on line 3—3 of Fig. 2.

Fig. 4 is a similar sectional view on line 4—4 of Fig. 2.

Fig. 5 is an enlarged transverse vertical sectional view through the firing zones.

Fig. 6 is a plan view showing a single tunnel kiln embodying my invention.

Fig. 7 is an enlarged horizontal section of the preheating zone and a portion of the firing zone of a single tunnel kiln embodying my invention, partly broken away.

Fig. 8 is a similar view of the cooling zone and adjacent portion of the firing zone of the single tunnel kiln illustrated in Fig. 7, partly broken away.

Fig. 9 is an enlarged transverse sectional view through the preheating zone on the line 9—9 of Fig. 7.

Fig. 10 is a similar section on line 10—10 of Fig. 7.

Fig. 11 is a similar section of the cooling zone on line 11—11 of Fig. 8.

Fig. 12 is a transverse section through the firing zone.

Fig. 13 is a detail view showing a slight modification of the driving means for the fans.

Fig. 14 is a sectional view similar to Fig. 3, showing a slightly modified construction of twin tunnel kiln embodying my invention.

Fig. 15 is a sectional view similar to Fig. 3 showing my invention embodied in a unitary twin tunnel kiln, in which there is no central wall or partition throughout the kiln, or at least throughout the end portions thereof at opposite ends of the firing zone.

Referring to the embodiment of my invention in a double tunnel kiln structure illustrated in Figs. 1 to 5 inclusive, I have shown in Fig. 1 a plan view of the entire kiln, and in Fig. 2 a partial plan view, both views being partly broken away, the kiln structure comprising the side walls, 1 and 2, and a central partition wall, 3, supported on the usual foundation, indicated at 4, preferably of concrete, the walls supporting roof arches, indicated at 5—5, vertical girders, 6, being provided on each side of the kiln at suitable intervals and connected by tie rods, 7, in the usual manner. The central portion of the kiln, indicated at A, constitutes a duplex firing chamber containing two firing zones, A¹ and A². Each of the end sections of the kiln, which are indicated at B and B¹ respectively, comprises a preheating zone, indicated at P, and a cooling zone, indicated at C, arranged side by side and separated by the central partition wall, 3. Each of the end sections, B, is also provided with a terminal portion, indicated at B², B³ respectively, having solid side walls and a solid partition wall, 3ª, forming a continuation of the central partition wall, 3, and provided at the outer end with doors, indicated at 8—8, the sections, B², B³, forming vestibules for the reception and discharge of cars of ware at opposite ends of the kiln. A line of tracks or rails, indicated at 9 and 9ª respectively, extend longitudinally throughout the length of each tunnel of the kiln, on which it will be understood that the cars, 10, loaded with stacks of bricks or other ware are propelled, the cars on one set of tracks moving in the opposite direction to that in which the cars on the other set of tracks are moved. It will be understood that each tunnel is occupied by an entire line of cars which are moved longitudinally by the insertion at the entering end of a fresh car of ware from the drier, which as it is pushed in forces out a car containing fired and cooled ware from the other end of the tunnel. The direction of movement of the cars on the tracks or rails, 9 and 9ª respectively, are indicated by arrows in Figs. 1 and 2.

It will thus be seen that the cars loaded with unfired ware from the drier are passed longitudinally through one of the preheating zones, P, one of the firing zones, A¹ or A², and one of the cooling zones, C, before being discharged, and that in each end section of the kiln there will be a line of cars passing in one direction through the preheating zone to the firing zone connected therewith, while on the other side of the partition wall, 3, there will be a line of cars loaded with highly heated fire ware, moving in the opposite direction from the communicating firing zone for that tunnel and being gradually cooled. As the end sections, B and B¹, at opposite ends of the tunnel are constructed in exactly the same manner, a description of the construction and operation of one of such end sections will serve for both.

The exterior side wall 2, for example, of the cooling zone, C, is preferably provided with a plurality of air inlet apertures, indicated at 11, (see Figs. 2 and 4) which are located at intervals longitudinally of the wall and have their inner ends approximately adjacent to the level of the top or supporting surface of the car, which is preferably formed of refractory material and provided with transverse passages, indicated for example at 10ª in Fig. 4. Each of the air inlet apertures, 11, of the cooling zone is provided with an independent damper, 12, or other regulating means so that the admission of fresh atmospheric air may be controlled at each point longitudinally of the cooling zone, and thereby any desired range or curve of cooling temperatures may be accurately maintained. The central partition wall, 3, is provided with a plurality of outlet ports, indicated at 13 in Fig. 3, which are preferably arranged out of transverse alignment with the air inlet ports, 11. These outlet ports, 13, communicate by vertical passages, 14, in the partition wall, 3, and by horizontal communicating passages, indicated at 15, beneath the adjacent tunnel containing preheating zone, P, with vertically disposed passages, 16, located in the outer wall, 1, or between it and a partition wall, 1ª, separating the passages, 16, from the portion of the preheating zone occupied by the cars, as shown in Fig. 3 for example. In any case each of the vertical passages, 16, which are located at intervals longitudinally of the preheating zone, communicates with the intake side of a fan or air moving device, 17, revolving on a horizontal axis and arranged to discharge the air admitted through the adjacent passage, 16, transversely through the lower portion of the stack of ware carried on the adjacent car. In this instance I have shown a series of rotary fans, 17, extending the entire length of the preheating zone along the outer side thereof and located immediately above the partition wall, 1ª, so that the lower edges of the fans are substantially in alignment with the top of the goods supporting portions of the cars, and each fan will act to withdraw heated air from one (or more) of the outlet or eduction ports, 13, of the adjacent cooling zone and discharge it through the lower portion of the ware. The fans are conveniently supported by horizontal shafts, 18, mounted in bearings, 19, located and supported outside of the kiln where they will not be exposed to the higher temperatures within the kiln. These fans may be driven in any desired manner; for example from a longitudinal driving shaft, indicated at 20, extending the length of the preheating zone and provided with pulleys, 21, each of which is connected by a belt, 22, with a pulley, 23, on one of the fan shafts, 18. The fans are conveniently made of any suitable material, as a metal alloy, capable of withstanding the high temperatures to which they are exposed in the preheating zone. I preferably make each fan, 17, of greater capacity than is required to withdraw the air from the adjacent cooling zone through the passages, 16, 15, 14, and port, 13, so that after the air is discharged horizontally through the ware, as indicated by the arrows, *x*, in Fig. 3, it will pass upwardly and be drawn back through the upper part of the stack of ware and over the top thereof, as indicated by the arrows, *y*, returning to the fan through the upper part of the space, indicated at 24, above the partition wall, 1ª, and vertical passages, 16, so that the air will be recirculated and caused to pass more than once through, around and in contact with the ware. The partition wall, 3, is also provided with a plurality of eduction ports, 25, opening from the preheating zone and communicating by vertical passages, 26, in the partition wall, and horizontal passages, 27, in the concrete base or foundation with an eduction flue, 28, preferably located entirely outside of the kiln and connected to a suction means, as a stack or suction fan, for example. In this instance the flue, 28, is shown as connected with a stack, 29, through which the air after it has served its purpose of heating, water-smoking and oxidizing the ware, together with the gases and vapors resulting therefrom, is discharged into the atmosphere or otherwise disposed of.

I also provide separate and independently operable dampers for controlling the admission of heated air to the preheating chamber through each of the vertical passages, 16, for example by a series of horizontal dampers, 30, (one of which is shown in Fig. 3) in the form of blocks which may be operated from the exterior of the kiln to control the passages, 16. I also prefer to provide each of the eduction passages, 27, with a damper, as the vertically movable dampers, one of which is indicated at 31 in Fig. 4. The eduction ports, 25, for the preheating zone are preferably located out of alignment with the adjacent fan or fans on the opposite side, and it will be seen that as the heated air from the cooling zone is being continually drawn into the preheating zone through the passages, 14, 15 and 16, and circulated and recirculated through the ware, all portions thereof will be brought into contact with the heated air which is continually in motion as it passes over the surfaces of the ware, so that the gases and vapors formed by the heating and oxidizing will be swept away from the surfaces of the ware as rapidly as formed, bringing fresh portions of heated air into contact therewith, so that the elimination of carbon, sulphur and other oxidizable matter in the clay will take place much more rapidly than would be the case if the air was not circulated in this manner, so that as a matter of fact the length of the preheating zone can be materially reduced. It will also be seen that in the preheating operation the heat curve can be very readily controlled by the operator by means of the dampers, 30, so that more or less heated air can be delivered by each of the passages, 16, according to the regulation of the dampers, and in this manner the heat curve can be so arranged as to best insure the elimination of oxidizable matter as sulphur, carbon, etc., according to the character of the material in the ware. For example in some clays it may be found desirable to raise the temperature quickly in the preheating zone up to a certain point and thereafter raise the temperature very gradually through the remainder of the travel of the ware therethrough, while in the case of other clays it will be found desirable to raise the temperature very gradually during the first portion of the travel of the ware therethrough and thereafter increase the temperature rapidly, or to effect a gradual raise of temperature throughout the travel of the ware throughout the preheating zone.

In the cooling zone the introduction of fresh atmospheric air into said zone, and particularly where the products of combustion from the firing zone are prevented from entering the cooling zone with the fired ware, effects the cooling of the ware more rapidly than otherwise result, and I am also able to control the admission of this air, both as to its total quantity per minute and also to admit the air in larger quantities at certain portions of the cooling zone than at others, by means of the regulating valves or dampers, 12, so that any desired range of cooling temperatures or cooling curve can be maintained, and the ware may be cooled more rapidly at certain portions of its travel through the cooling zone than at other portions, if desired. In other words, the temperatures of the cooling zone throughout its length is under the direct control of the operator and can be suited to the particular character of the ware, to give the best results. It will also be seen that the adjustment of the dampers, 12, does not have to correspond at all with the adjustment of the dampers, 30, controlling the admission of the heated air to the fans in the preheating zone, as the eduction ports, 13, will deliver the air to the preheating zone in accordance with the setting of dampers, 30, regardless of the setting of the dampers, 12. The operator, therefore, has entire control of both the preheating and cooling operations, and the heat of the fired ware is recovered and employed in the preheating zone. Of course it will be necessary to so adjust the dampers, 12, that a total amount of air may be admitted to the cooling zone sufficient for the requirements of the preheating zone under the control of the dampers, 30, but this can be very readily arranged. Moreover the arrangement of the inlet ports, 11, and the eduction ports, 13, for the cooling zone on opposite sides of the ware and adjacent to the level of the supporting surfaces of the cars results in a very thorough circulation of the air around and through the ware stacked thereon, as the heat imparted to the air from contact with the heated ware causes it to rise through and around the ware and become more and more highly heated, while the location of the eduction ports through which it is sucked out by the fans, 17, in the preheating zone will draw the heated air downward and carry it out through the connecting passages. In practice it is found that the efficiency of this cooling zone is such that its length may be decreased to substantially the same extent as the length of the preheating zone, thereby effecting further economy in the construction of the kiln.

As before stated, the amount of heat units taken out of the cooling zone by the air will be equal to the total amount of heat units supplied to the preheating zone less radiation and conduction losses, but as the rise in temperature in the preheating zone is substantially 900 degrees or 1000 degrees, that is to say 300° F. to 1200° F. or 1300° F., where as the drop of temperature in the cooling zone is approximately from 1900° F., to 500° F. or 600° F., or about 1400 degrees, a sufficient amount of heat for preheating will always be supplied from the cooling zone regardless of ordinary losses by radiation, etc.

In Fig. 5, I have shown one form of firing zone which may be conveniently employed in connection with the preheating and cooling zones constructed as previously described. The particular construction of this firing zone is substantially similar to that shown in my former Letters Patent of the United States, No. 1,652,570 dated December 13, 1927 and will not be specifically claimed herein. The central portion, A, of the kiln between the two end sections, B and B¹, both of which are constructed as previously described, with the relative positions of the preheating and cooling zones reversed, as indicated at P¹ and C¹ in Fig. 1, consists of a duplex firing chamber containing two firing zones, A¹, A², separated by a portion of the central partition wall, 3, which as shown herein is imperforate and flueless. Each firing zone is provided with a row of furnaces arranged along its outer wall and arranged for direct firing. In this instance I have shown gas furnaces comprising the burners, 35, supplied with gas or other hydro-carbon fuel by a main fuel pipe, 36, and branches, and with air by a main air pipe, 37, and branches, the branch air and gas pipes being provided with independently adjustable controlling valves, indicated at 38 and 39 respectively, so that each furnace way be independently controlled. Each of the heating zones is provided on the side of the goods space adjacent to the furnaces with a longitudinally extending bag wall or deflecting wall, indicated at 40, the upper edge of which is preferably curved inwardly toward the goods space, and vertical passages, 41, are formed between the outer wall of the furnaces and the bag wall, so that the products of combustion from the furnaces are carried upwardly over the top of the bag wall and discharge downwardly upon and through the ware. Each firing zone is also provided with means for positively withdrawing the heated products of combustion after they have given up the greater portion of their heat to the ware, and this is accomplished conveniently by means of eduction ports, 43, in the inner face of the bag wall, 40, approximately at about the level of the supporting surfaces of the cars, which ports are connected by eduction passages, 44, with a longitudinally extending eduction flue, 45. These eduction passages, 44, conveniently extend through solid masonry portions, connecting the bag wall with the outer wall of the firing zone between the vertical passages 41, as indicated at 42. The eduction ports or passages, 44, are also each provided with a controlling valve, 46, so that throughout the length of each firing zone the admission of heated products of combustion from each furnace is under direct and independent control, and the heated products of combustion after performing their work are immediately withdrawn through the eduction pipes, 44, also under independent control. In order to positively withdraw the products of combustion, the eduction flue, 45, is preferably connected with air moving means, as a stack or suction fan, and these gases may be employed for any useful purpose by which the heat thereof may be recovered, such as the heating of air for the burners and for use in driers, etc., by means of a suitable recuperator or otherwise. In this instance, I have shown a recuperator, indicated at 47, operating in a well known way, connected with the eduction flue, 45, and interposed between said flue, and a suction fan, indicated at 48, air being admitted to the recuperator through the inlet passage, 47ª, and discharged through the pipe or passage, 49, which may be connected for example by a pipe, 50, with the air pipe, 37, and by a pipe, 51, to a drier, not shown, or other suitable device. The spent products of combustion after leaving the fan, 48, may pass to a stack, 52, or to any other suitable point. It will be understood that the construction of each firing zone, A¹ and A², will be the same as that previously described and as shown in the drawings. As the cars move in one direction through the firing zone, A¹, and in the opposite direction through the firing zone, A², the heat curves for the firing zones will be exactly opposite, for example, assuming that the desired temperature at the entering end of the firing zone, A², is substantially 1200° F., the burners and eduction ports will be adjusted to give the desired rising heat curve as the cars move (to the right in Fig. 1) so as to produce a temperature of substantially 1900° F., at the discharge end of the zone, $A^2$, when the cars pass into the connected cooling zone, $C^1$. In the firing zone, $A^1$, the entering end where the temperature of 1200° F., is to be maintained will be opposite the discharge end of the zone, $A^2$, and the furnaces and eduction passages will be so regulated as to produce the desired rising heat curve as the cars pass to the left in Fig. 1, toward the discharge end of the zone, $A^1$, from which they pass into the connected cooling zone, C. The air forcing means, as the fans, 48, 48, connected with eduction flues, 45, of the respective firing zones will have capacity slightly in excess of that required to withdraw all the products of combustion discharged into the zone with which they are connected, so that the products of combustion will not be permitted to flow endwise into the connecting preheating and cooling zones which are directly connected thereto without any partition. This prevents the scumming or staining of the ware by contact of the products of combustion with the ware before the preheating, oxidation and watersmoking is accomplished, and at the same time avoids interference with the regulation of the preheating and cooling zones previously described, which would be seriously interfered with by the end flow of such products of combustion. While I prefer to employ the type of firing zone herein shown and described, I wish it to be understood that other forms of firing zones may be used in connection with the preheating and cooling zones previously described, and the ware may be fired either by direct firing or indirect firing. I also wish it understood that the improved preheating zone herein shown and described may be employed in other forms of tunnel kilns and supplied with heated air from the cooling zone or other source.

In Figs. 6 to 12 inclusive, I have shown my invention embodied in a single tunnel kiln in which figures the parts previously described and illustrated in Figs. 1 to 5 inclusive are given the same numerals with the addition of 100. In Figs. 6 to 12 inclusive, the central portion of the kiln represented at $A^3$, is provided with a single firing zone, $A^4$. The firing zone may be heated by a single row of furnaces arranged along one side, or by a double row of furnaces arranged on opposite sides, as preferred and as shown in the drawings. As the construction and operation of the firing zone, $A^4$, will be exactly the same as that previously described with reference to the operation of either firing zone of the twin tunnel kiln, except that in this case the products of combustion will be discharged into and removed from the kiln at both sides, it will be unnecessary to again describe the construction and operation of this portion of the single tunnel kiln in detail. In this instance, I have shown the eduction flues, 145, for the furnaces on the opposite sides of the kiln connected to a common recuperator, 147, for heating air which is supplied to the burners of both sets of furnaces and to a drier or driers, not shown, or other use. In the single tunnel kiln, the cars entering the vestible portion, $B^4$, will all move in one direction along the tracks, 109, successively through the preheating zone, firing zone and cooling zone to the vestibule portion, $B^5$, at the opposite end of the kiln. The end portion, $B^3$, of the kiln contains the preheating zone, $P^2$, which is constructed substantially as hereinbefore described, reference being had to Figs. 9 and 10. In this instance the heated air is conveyed from the cooling zone, $C^2$, which is at the opposite end of the kiln, by means of a hot air flue, indicated at 115, extending past the firing zone and longitudinally of the preheating zone, and conveniently below the vertically disposed passages, 116, leading to the induction side of the fans, 117, and controlled by the dampers, 130, in exactly the same manner as hereinbefore described.

The fans, 117, discharge the incoming heated air directly across the lower portion of the goods space and have sufficient capacity beyond the suction requirements to effect recirculation of the air, as previously described. On the opposite side of the preheating zone are a series of eduction ports, 125, connected with passages, 126, 127, with a longitudinal eduction flue, 128, located preferably outside of the kiln and connected with an exhaust fan or stack. In this instance, I have shown the eduction flue connected with a stack, 129. The eduction ports and the passages connecting them with the eduction flue are preferably provided with independently operable dampers, 131.

The fans, 117, are shown as mounted on horizontal shafts separately driven from the exterior of the kiln in the same manner as previously described.

In Fig. 11, I have shown a cross-sectional view of the cooling zone, $C^2$, which is provided at intervals along one side with air inlet apertures, 111, located adjacent to the level of the supporting surfaces of the cars, or in other words adjacent to the lower portion of the goods space, and on the opposite side of the cooling zone are a longitudinal series of outlet ports, 113, connected by passages, 114, with a longitudinally extending conducting flue, 115, previously referred to, which extends lengthwise of the cooling zone, past the firing zone and lengthwise of the preheating zone, where it is connected with the inlet passages, 116. This flue is conveniently carried throughout its entire length entirely outside of the kiln and preferably below the surface of the ground. I find it convenient, however, to carry it beneath one side of the preheating zone in the foundations thereof, so that the heated air may ascend substantially vertically through the inlet passages, 116, to the fans. It will be seen that in the single tunnel kiln the heated fresh air for preheating, oxidizing and water-smoking is furnished from the cooling zone, which is in this instance located at the opposite end of the kiln, but the operation and efficiency of the kiln is the same as previously described with reference to the twin tunnel construction in which the heated air for each preheating zone is taken from an adjoining cooling zone of the other tunnel. The air inlet apertures, 111, may also be provided, if desired, with dampers indicated at 112, corresponding with the dampers, 12, in Fig. 4, and the eduction ports and passages for the cooling zone are also shown provided with dampers, indicated at 114ª. I may use either or both of these series of dampers for controlling the admission of air and the eduction of heated air at different points longitudinally of the cooling zone, so as to establish and maintain the desired cooling curve. This independent regulation of the portions of the cooling zone throughout its length is, of course, entirely independent of the control of the preheating zone to establish and maintain a rising heat curve therein, the heated air from the cooling zone being in this instance collected in the connecting hot air conducting flue, 115, and redistributed at different points longitudinally of the preheating zone under the control of the dampers, 130.

The operation of the single tunnel kiln will be exactly the same as that of each of the tunnels of the twin tunnel kiln previously described, and it need not therefore be repeated. It will be understood that in both embodiments of my invention a predetermined path of circulation of the heated air in the preheating zone will result by reason of the fact that the air inlets, (16 or 116) by which the heated air is admitted and which I preferably term the "initial inlets", and the fans are located adjacent to the lower portion of the goods space, and that the fans discharge this air substantially horizontally in a direction transversely of the kiln. The heated air discharged by these fans, which are located adjacent to the lower portion of the goods chamber will penetrate through the lower portions of goods on the cars from one side of the preheating zone to the other, and will be forced to return in the opposite direction through the upper portions of the goods on the cars, and over the top of the goods on the cars. The circulation will also be upward at the side of the zone remote from the fans and along the side of the kiln adjacent to and in rear of the fans. There will also be some circulation upward through the ware. This effects the most efficient circulation along the shortest path or paths by which the air may thoroughly penetrate the entire carload of ware and return to the starting points. In the ideal case, there would be a horizontal plane of no circulation just above the tops of the fans, below which the circulation would be transversely of the kiln away from the fans and above which the circulation would be transversely of the kiln in the opposite direction, toward the fans. This ideal of course can be achieved only approximately on account of the construction of the kiln which must provide a certain amount of space above the ware, so that a portion of the return currents toward the fans will drift through this space, but a very considerable portion of the return currents pass through and around the upper portions of the ware on the cars. There will also be some tendency for portions of the lower currents to pass upwardly through the ware and get into the return currents flowing in the opposite direction. The ultimate effect, however, is to greatly expedite oxidation and water-smoking, and to sweep away the gases and vapors generated thereby to bring fresh heated air continuously into contact with the ware, and also to continuously draw off the air and the contained gases and vapors and eliminate the latter from the kiln. As before stated, the increased capacity of the fan above its suction requirements permits of recirculating portions of the air while other portions will be discharged through the eduction ports and the eduction flue, carrying with them the gases and vapors evolved by the preheating, oxidizing and water-smoking. The independently operable dampers, (31 or 131) which control the eduction of the heating and oxidizing medium co-operate with the dampers, (30 or 130) for independently controlling the initial air inlets in regulating not only the heat curve but also the supply of oxygen for oxidizing the carbon, sulphur and other oxidizable materials in the clay, at different points longitudinally of the preheating zone, so that the elimination of the oxidizable compounds is under accurate control.

It will also be noted that the entire circulation of the air in the preheating zone occurs within the zone itself from the time it enters through the initial air inlets until it is discharged through the eduction ports. This feature of my invention enables me to dispense with all flues in the walls of the kiln for circulating purposes, and greatly cheapens the cost of construction.

It will also be seen that in my invention the control of the heated air and the circulation thereof at different points longitudinally of the preheating zone may be effected not only by the dampers previously described, but also by independently controlling the speed of revolution of the different fans located at different points longitudinally of said zone. This may be accomplished in either of the embodiments of my invention herein shown, in a very simple manner by changing the relative sizes of the pulleys, (21 and 23, or 121 and 123) so as to vary the speed of different fans in the series. It is, of course, obvious that this result may be accomplished in other ways, as for example by providing each fan with a separate motor, as indicated for example in Fig. 13, in which one of the fans is indicated at 217, having its shafts, 218, connected with an electric motor, 220, controlled by a suitable rheostat, 220$^a$, so that the speed of each individual fan can be independently controlled where this is found desirable.

It will also be understood that by controlling the introduction and eduction of the heating and oxidizing medium and the speed of the fans, the degree of concentration of contaminating gases and vapors at different points longitudinally of the preheating zone may also be controlled. Obviously if the gases contain too great a degree of sulphur for example, at a particular point, etc., which can be readily ascertained, the remaining sulphur in the ware would not be evolved so readily and the oxidation of the ware would be slowed up correspondingly. In such cases the gases and vapors may be withdrawn more rapidly at this point and more fresh air may be admitted, and the speed of the adjacent fan or fans may be increased if necessary. On the other hand, if too little sulphur, for example, is present in the waste gases at a particular point in the preheating zone, it would indicate that there is a heat loss at that point, and that air is being supplied, the waste gases are being drawn off more rapidly than necessary, in which case the supply of heated air may be reduced at each point, or the dampers controlling the eduction ports, (31 or 131) adjacent to such point may be partially closed or both.

It will be understood also that the goods space of each tunnel, whether of the single tunnel or twin tunnel kiln, will be separated from the portion of the tunnel below the cars, in any desired or usual manner to protect the wheels and metal bodies of the cars from the heat in the tunnel. This may be conveniently accomplished by means of the usual sand seals, the opposite sides of each tunnel being provided with longitudinal sand receptacles extending the entire length of the tunnel and indicated at 60 in Figs. 3, 4 and 5, and at 160 in Figs. 9, 10, 11 and 12, which are engaged by flanges, 10$^b$, (or 110$^b$), depending from the sides of the car bodies.

In Fig. 14, I have illustrated a slightly modified form of twin tunnel kiln embodying my invention, in which figure the parts corresponding with those shown in Figs. 1 to 5 inclusive are given the same reference characters with the addition of 300 to avoid repetition.

In this construction the cold air is admitted to each of the cooling zones through the air inlet apertures, 311, into the space below the cars and is taken up by passages, 311$^a$, formed in the central wall, 303, and delivered into the goods space of the cooling zone above the supporting surfaces of the cars and into contact with the heated ware from the aligned firing zone, which is to be cooled. This arrangement for the admission of the cooling air possesses the advantages of keeping down the temperature of the metallic portions of the cars and also cooling the portion of the central partition wall, 303, in the lower portions thereof adjacent to the sand seals.

The outlet passages, 313, for the cooling zone are in this instance located in the outer wall and may be conveniently provided with dampers, indicated at 312, the outlet passages, 313, being connected by communicating passages, 315, with hot air inlet passages, 316, discharging into the preheating zone adjacent to the suction and circulating fans, 317. In this instance the preheating zone is provided with a plurality of eduction pipes or passages, one of which is indicated at 325, and which are preferably formed by pipes which extend inwardly from the exterior wall of the preheating zone substantially midway between the fans, 317, and have their inner ends opening into the preheating zone beyond the pressure face of the fan where the heated air in said zone is under a certain amount of compression. These pipes or passages, 325, are connected by passages, 326, with a common eduction flue, 328, preferably located outside of the kiln and connected to a suction means, as a stack or suction fan, in a manner previously described with reference to Figs. 1 to 5. The hot air inlet flues, 316, for the preheating zone are preferably provided with independent regulating dampers, 330, and the eduction passages for the preheating zone may also be provided with regulating dampers, 327. If it is found necessary or desirable, each of the air inlets, 311, for the cooling zone may also be provided with independent regulating dampers, 311$^b$, and it will be seen that the independent control of the admission of cold air to and discharge of hot air from the cooling zone, at different points throughout its length, and the admission of heated air from the cooling zone to the preheating zone and the withdrawal therefrom of said air with the vapors and gases of preheating, at different points longitudinally of the preheating zone, are under the complete control of the operator. The operation of this form of kiln will be exactly the same as that described with reference to Figs. 1 to 5 inclusive, and need not be repeated.

In Fig. 15, I have shown my invention embodied in a twin tunnel kiln of the type shown in my former Letters Patent No. 1,652,570, dated December 13, 1927, hereinbefore referred to, in which each of the end sections of the kiln contains a single chamber without a central partition serving as a combined cooling and preheating chamber, and parallel goods conveying means move in opposite directions through the entire kiln. This construction results in having in each of the end sections of the kiln a row of cars of heated ware on one track moving from the firing chamber toward the end of the kiln, while alongside thereof are cars of dried unfired ware to be preheated which are moving toward the firing chamber. In this construction the heat for preheating the latter ware is derived from the hot fired ware both by radiation and convection.

Fig. 15 shows a transverse vertical section of one of the end sections of the kiln, and the parts corresponding with those shown in Figs. 3 and 4 are given the same reference numerals with the addition of 400. In this construction the fans, 417, are arranged in longitudinal series along one side of the chamber, (in this instance adjacent to the ware to be preheated) marked in the drawing with the word "preheating" and adjacent to the lower portion of the goods spaces occupied by the unfired and the fired ware, the latter ware being indicated by the word "cooling" on the drawing. The chamber is provided with inlets for fresh air from the atmosphere, which need not be heated and is preferably admitted through a longitudinal series of inlet apertures, indicated at 411, provided with dampers, 412, the inlet apertures being preferably located immediately adjacent to the fans.

The air admitted through inlet apertures, 411, is delivered horizontally across the chamber through the preheating and hot fired ware, and the capacity of the fans is such as to circulate and recirculate the air within the chamber, so that it returns across the chamber horizontally at a higher level, through and around higher portions of the fired and unfired ware in the manner previously described. In this case however, the unfired ware is heated both by radiation from the fired ware and by convection as before stated and the incoming fresh air, which is at lower temperature than the fired ware, furnishes oxygen for oxidizing and water-smoking the unfired ware, and continuously sweeps away the gases and vapors therefrom, and also facilitates the cooling of the fired ware.

The chamber is also provided with means for withdrawing the said air together with the vapors and gases of preheating, and I preferably provide each of the combined cooling and preheating chambers with a longitudinal series of eduction ports, 425, connected by passages, 426, 427, (one of which is indicated in dotted lines) with a longitudinal collecting flue, 428, leading to a stack or other suitable air withdrawing means, each of the passages, 426, 427, being preferably provided with a damper, 431, one of which is shown in dotted lines in Fig. 15.

What I claim and desire to secure by Letters Patent is:—

1. A tunnel kiln having its preheating zone or zones provided with a plurality of initial inlets for oxidizing a gaseous medium, disposed at intervals along one side of said zone adjacent to the lower portion of the goods space thereof, a longitudinal series of mechanical gas propelling devices located within said zone adjacent to said inlets and constructed to discharge the said medium transversely across the lower portion of said goods space, said zone being provided with a series of outlet ports for delivering the said medium together with gases and vapors of preheating from said zone, and means for supplying an oxidizing gaseous medium to said inlets.

2. A tunnel kiln having its preheating zone or zones provided with a plurality of initial inlets for a gaseous medium, disposed at intervals along one side of said zone adjacent to the lower portion of the goods space thereof, a longitudinal series of mechanical gas propelling devices located within said zone adjacent to said inlets and constructed to discharge the said medium transversely across the lower portion of said goods space, said zone being provided on the side opposite said inlets and adjacent to the lower portion of the goods space with a series of outlet ports for delivering the said medium together with gases and vapors of preheating from said zone, means for supplying an oxidizing gaseous medium to said inlets, and means for independently controlling the admission of said medium through said initial inlets.

3. A tunnel kiln having its preheating zone or zones provided with a plurality of initial inlets for a gaseous medium, disposed at intervals along one side of said zone adjacent to the lower portion of the goods space thereof, a longitudinal series of mechanical gas propelling devices located within said zone adjacent to said inlets and constructed to discharge the said medium transversely across the lower portion of said goods space, said zone being provided on the side opposite said inlets and adjacent to the lower portion of the goods space with a series of outlet ports for delivering the said medium together with gases and vapors of preheating from said zone, means for supplying an oxidizing gaseous medium to said inlets, and independently operable controlling means for said initial inlets.

4. A tunnel kiln having its preheating zone or zones provided with a plurality of initial inlets for a gaseous medium, disposed at intervals along one side of said zone adjacent to the lower portion of the goods space thereof, a longitudinal series of mechanical gas propelling devices located within said zone adjacent to said inlets and constructed to discharge the said medium transversely across the lower portion of said goods space, said zone being provided on the side opposite said inlets and adjacent to the lower portion of the goods space with a series of outlet ports for delivering the said medium together with gases and vapors of preheating from said zone, means for supplying an oxidizing gaseous medium to said inlets, said gas propelling devices having sufficient capacity to effect the return of said medium transversely across said zone at a higher level, and the recirculation of said medium within the main chamber of said zone, before it passes through said outlets, and means for supplying an oxidizing gaseous medium to said inlets.

5. A tunnel kiln having its preheating zone or zones provided with a plurality of initial inlets for a gaseous medium, disposed at intervals along one side of said zone adjacent to the lower portion of the goods space thereof, a longitudinal series of mechanical gas propelling devices located within said zone adjacent to said inlets and constructed to discharge the said medium transversely across the lower portion of said goods space, said zone being provided on the side opposite said inlets and adjacent to the lower portion of the goods space with a series of outlet ports for delivering the said medium together with gases and vapors of preheating from said zone, means for supplying an oxidizing gaseous medium to said inlets, said gas propelling devices having sufficient capacity to effect the return of said medium transversely across said zone at a higher level, and the recirculation of said medium within the main chamber of said zone, before it passes through said outlets, means for supplying an oxidizing gaseous medium to said inlets, independently operable regulating devices for said inlets and independently operable devices for said outlets.

6. A tunnel kiln having its preheating zone or zones provided with a plurality of initial inlets for a heating and oxidizing gaseous medium, disposed at intervals along one side of said zone adjacent to the lower portion of the goods space thereof, a longitudinal series of fans located within said zone adjacent to the lower portion of the goods space and having their axes disposed transversely of the kiln, said fans being arranged adjacent to said inlets, and constructed to draw the said medium into said zone and discharge it transversely through the goods, and circulate it through and around the same entirely within the kiln, means for supplying a heating and oxidizing gaseous medium to said inlets, and means for withdrawing said medium with the gases and vapors of preheating, at separate points longitudinally of said zone and conducting them away from the kiln.

7. A tunnel kiln having its preheating zone or zones provided with a plurality of initial inlets for a heating and oxidizing gaseous medium disposed at intervals along one side of said zone adjacent to the lower portion of the goods space thereof, a longitudinal series of fans located within said zone adjacent to the lower portion of the goods space and having their axes disposed transversely of the kiln, said fans being arranged adjacent to said inlets, and constructed to draw the said medium into said zone and discharge it transversely through the goods, and circulate it through and around the same entirely within the kiln, means for supplying a heating and oxidizing gaseous medium to said inlets, said zone being provided with a longitudinal series of outlets for conducting said medium and the gases and vapors of preheating away from the kiln, on the side opposite from said inlets, and independently operable means for regulating the amount of said medium circulated, located at different points longitudinally of the said zone.

8. A tunnel kiln having its preheating zone or zones provided with a plurality of initial inlets for a heating and oxidizing gaseous medium, disposed at intervals along one side of said zone adjacent to the lower portion of the goods space thereof, a longitudinal series of fans located within said zone adjacent to the lower portion of the goods space and having their axes disposed transversely of the kiln, said fans being arranged adjacent to said inlets, and constructed to draw the said medium into said zone and discharge it transversely through the goods, and circulate it through and around the same entirely within the kiln, means for supplying a heating and oxidizing gaseous medium to said inlets, said fans having each a capacity greater than necessary to draw said medium into said zone, enabling them to effect the recirculation thereof entirely within the main chamber of said zone, said zone being provided with a series of outlets on the opposite side of said goods space from said inlets, and independently operable means for regulating the amount of medium circulated in said zone, located at intervals longitudinally of said zone.

9. A tunnel kiln having its preheating zone or zones provided with a plurality of initial inlets for a heating and oxidizing gaseous medium, disposed at intervals along one side of said zone adjacent to the lower portion of the goods space thereof, a longitudinal series of fans located within said zone adjacent to the lower portion of the goods space and having their axes disposed transversely of the kiln, said fans being arranged adjacent to said inlets, and constructed to draw the said medium into said zone and discharge it transversely through the goods, and circulate it through and around the same entirely within the kiln, means for supplying a heating and oxidizing gaseous medium to said inlets, means for withdrawing said medium with the gases and vapors of preheating at separated points longitudinally of said zone and conducting them away from the kiln, and means for independently controlling the speed of said fans.

10. A tunnel kiln having its preheating zone or zones provided with a plurality of initial inlets for a heating and oxidizing gaseous medium, disposed at intervals along one side of said zone adjacent to the lower portion of the goods space thereof, a longitudinal series of fans located within said zone adjacent to the lower portion of the goods space and having their axes disposed transversely of the kiln, said fans being arranged adjacent to said inlets, and constructed to draw the said medium into said zone and discharge it transversely through the goods, and circulate it through and around the same entirely within the kiln, means for supplying a heating and oxidizing gaseous medium to said inlets, said zone being provided with a longitudinal series of outlets for conducting said medium and the gases and vapors of preheating away from the kiln, means for independently regulating the speed of said fans, and independently operable means for regulating the amount of said medium circulated in said zone located at intervals longitudinally of said zone.

11. A tunnel kiln provided with aligned preheating, firing and cooling zones and goods conveying means movable successively therethrough, said cooling zone being provided with air inlets and air outlets at intervals longitudinally thereof, said preheating zone being provided with initial inlets located at intervals longitudinally thereof, a series of gas propelling mechanical devices located at intervals longitudinally of and at one side of the preheating zone adjacent to the lower portion of the goods space thereof for propelling the air admitted through said initial inlets transversely of the preheating zone, means for conducting the heated air from the outlets of a cooling zone of the kiln to the initial inlets of a preheating zone of the kiln, and means for withdrawing the air together with vapors and gases of preheating, from said preheating zone.

12. A tunnel kiln provided with aligned preheating, firing and cooling zones and goods conveying means movable successively therethrough, said cooling zone being provided with air inlets and air outlets at intervals longitudinally thereof, said preheating zone being provided with initial inlets located at intervals longitudinally thereof, a series of fans located at intervals longitudinally of and at one side of the preheating zone adjacent to the lower portion of the goods space thereof and in operative relation with said initial inlets, and constructed to discharge the air entering through said initial inlets transversely of said zone, means for independently regulating said initial inlets to maintain a predetermined rising heat curve in the preheating zone and control the oxidation of the ware, and means for conducting heated air from the outlets of a cooling zone of the kiln to the initial inlets of a preheating zone thereof.

13. A tunnel kiln provided with aligned preheating, firing and cooling zones and goods conveying means movable successively therethrough, said cooling zone being provided with air inlets and air outlets at intervals longitudinally thereof, said preheating zone being provided with initial inlets located at intervals longitudinally thereof, a series of fans located at intervals longitudinally of and at one side of the preheating zone adjacent to the lower portion of the goods space thereof and in operative relation with said initial inlets, and constructed to discharge the air entering through said initial inlets transversely of said zone, means for independently regulating said initial inlets to maintain a predetermined rising heat curve in the preheating zone and control the oxidation of the ware, means for conducting heated air from the outlets of a cooling zone of the kiln to the initial inlets of a preheating zone thereof, and independently operable means located at different points longitudinally of the cooling zone for controlling the amount of air entering the same for maintaining a descending cooling curve in the cooling zone.

14. A tunnel kiln provided with aligned preheating, firing and cooling zones and goods conveying means movable successively therethrough, said preheating zone being provided with air forcing means for effecting a circulation in the preheating zone, and simultaneously withdrawing gaseous material from a cooling zone of the kiln for circulation in the said preheating zone.

15. A tunnel kiln provided with aligned preheating, firing and cooling zones and goods conveying means movable successively therethrough, gas propelling means in said preheating zone for effecting a circulation therein, and means for connecting portions of said preheating zone adjacent to said gas propelling means with portions of a cooling zone of the kiln, for enabling said gas propelling means to withdraw gaseous material from the cooling zone.

16. A tunnel kiln provided with aligned preheating, firing and cooling zones and goods conveying means movable successively therethrough, a longitudinal series of fans located in the preheating zone for effecting circulation within the same, and means for connecting portions of the preheating zone adjacent to each of said fans with a cooling zone of the kiln for enabling said fans to withdraw gaseous material from said cooling zone and deliver it into the said preheating zone.

17. A tunnel kiln provided with aligned preheating, firing and cooling zones and goods conveying means movable successively therethrough, a series of fans arranged longitudinally of the preheating zone adjacent to the lower portion and at one side of the goods space therein, means for connecting the preheating zone adjacent to each fan with portions of a cooling zone of the kiln, said fans being constructed to withdraw gaseous material from said cooling zone and deliver it transversely of the preheating zone.

18. A tunnel kiln provided with aligned and directly communicating preheating, firing and cooling zones and goods conveying means moving successively therethrough, the preheating zone being provided with a plurality of initial inlets for a heating and oxidizing gaseous medium disposed at intervals along one side of said zone adjacent to the lower portion of the goods space thereof, a longitudinal series of mechanical gas propelling devices located in said zone adjacent to said inlets and constructed to circulate said medium transversely of said zone, said zone being provided with a longitudinal series of outlets for withdrawing said medium together with gases and vapors of preheating from said zone, means for supplying a heated gaseous medium to said inlets, direct firing furnaces for said firing zone, and means for withdrawing the products of combustion from the firing zone to prevent access thereof to the preheating zone.

19. A tunnel kiln provided with aligned and directly communicating preheating, firing and cooling zones and goods conveying means movable successively therethrough, a longitudinal series of fans in said preheating zone adjacent to the lower portion and at one side of the goods space therein, said preheating zone being provided with initial hot air inlets adjacent to said fans, means for connecting said inlets with a cooling zone of the kiln, means for admitting air to said cooling zone, said fans being constructed to deliver the heated air from said initial inlets transversely of the preheating zone, direct firing furnaces for the firing zone, and means for withdrawing the products of combustion from the firing zone to prevent end flow thereof into the preheating and cooling zones.

20. A tunnel kiln provided with aligned and directly communicating preheating, firing and cooling zones and goods conveying means movable successively therethrough, a longitudinal series of fans in said preheating zone adjacent to the lower portion and at one side of the goods space therein, said preheating zone being provided with initial hot air inlets adjacent to said fans, means for connecting said inlets with a cooling zone of the kiln, means for admitting air to said cooling zone, said fans being constructed to deliver the heated air from said initial inlets transversely of the preheating zone, direct firing furnaces for the firing zone, and means for withdrawing the products of combustion from the firing zone to prevent end flow thereof into the preheating and cooling zones, independently operable means for regulating said initial inlets, said preheating zone being provided with a longitudinal series of outlets for withdrawing the heated air, together with gases and vapors of preheating.

21. A tunnel kiln provided with aligned and directly communicating preheating, firing and cooling zones and goods conveying means movable successively therethrough, a longitudinal series of fans in said preheating zone adjacent to the lower portion and at one side of the goods space therein, said preheating zone being provided with initial hot air inlets adjacent to said fans, said cooling zone being provided with a longitudinal series of air inlets communicating with the atmosphere and a longitudinal series of outlets, means for connecting said outlets of a cooling zone of a kiln with the initial inlets of a preheating zone thereof, independently operable means located at different points longitudinally of the cooling zone for regulating the amount of air for cooling at different portions thereof, independently operable means for regulating the amount of heated air admitted to the preheating zone through said initial inlets, direct firing furnaces for said firing zone, and means for withdrawing the products of combustion from the firing zone to prevent end flow thereof into the adjacent preheating and cooling zones.

22. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of gas propelling means located in each preheating zone adjacent to said initial inlets, means for admitting air into each of said cooling zones at intervals longitudinally thereof, means for connecting the initial air inlets of each preheating zone with the adjacent cooling zone for withdrawing heated air from said cooling zone, and independently operable regulating means for controlling the amount of heated air through said initial inlets.

23. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of gas propelling means located in each preheating zone adjacent to said initial inlets, means for admitting air into each of said cooling zones at intervals longitudinally thereof, means for connecting the initial air inlets of each preheating zone with the adjacent cooling zone for withdrawing heated air from said cooling zone, the gas propelling means in each preheating zone being constructed to positively withdraw heated air from the adjacent cooling zone and discharge it transversely of said preheating zone.

24. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of gas propelling means located in each preheating zone adjacent to said initial inlets, means for admitting air into each of said cooling zones at intervals longitudinally thereof, means for connecting the initial air inlets of each preheating zone with the adjacent cooling zone for withdrawing heated air from said cooling zone, independently operable dampers for said initial inlets of the preheating zone, and independently operable means disposed longitudinally of the adjacent cooling zone for regulating the amount of cooling air in different portions of said zone.

25. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longtiudinal series of initial air inlets at one side of and adjacent to the lower portion of the goods space, and a longitudinal series of outlets for the air and gas and vapors of preheating, a longitudinal series of fans in each preheating zone adjacent to the initial inlets thereof, constructed to discharge the heated air transversely of said zone, each of said cooling zones being provided with a longitudinal series of air inlets communicating with the atmosphere, and a longitudinal series of air outlets and communicating passages connecting the air outlets of each cooling zone respectively with the initial air inlets of the adjacent preheating zone.

26. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of outlets for the air and gas and vapors of preheating, a longitudinal series of fans in each preheating zone adjacent to the initial inlets thereof, constructed to discharge the heated air transversely of said zone, each of said cooling zones being provided with a longitudinal series of air inlets communicating with the atmosphere, and a longitudinal series of air outlets and communicating passages connecting the air outlets of each cooling zone respectively with the initial air inlets of the adjacent preheating zone, controlling dampers for independently regulating the amount of air in different longitudinal portions of each cooling zone, and separate controlling dampers for independently regulating the heated air admitted through said initial inlets of each preheating zone.

27. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of outlets for the air and gas and vapors of preheating, a longitudinal series of fans in each preheating zone adjacent to the initial inlets thereof, constructed to discharge the heated air transversely of said zone, each of said cooling zones being provided with a longitudinal series of air inlets communicating with the atmosphere, and a longitudinal series of air outlets and communicating passages connecting the air outlets of each cooling zone respectively with the initial air inlets of the adjacent preheating zone, each cooling zone being provided with a longitudinal series of dampers for controlling the amount of cooling air in different portions longitudinally thereof to maintain the desired predetermined cooling curve, and each preheating zone being provided with a separate series of dampers for regulating the amount of heated air admitted through said initial inlets to maintain a predetermined rising heat curve therein, the fans in each of said preheating zones being so located and constructed to positively withdraw heated air from the adjacent cooling zone through said initial inlets.

28. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of outlets for the air and gas and vapors of preheating, a longitudinal series of fans in each preheating zone adjacent to the initial inlets thereof, constructed to discharge the heated air transversely of said zone, each of said cooling zones being provided with a longitudinal series of air inlets communicating with the atmosphere, and a longitudinal series of air outlets and communicating passages connecting the air outlets of each cooling zone respectively with the initial air inlets of the adjacent preheating zone, direct firing furnaces for each of said firing zones, and means for withdrawing the products of combustion from each of said firing zones to prevent end flow thereof into the adjacent preheating and cooling zones.

29. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of outlets for the air and gas and vapors of preheating, a longitudinal series of fans in each preheating zone adjacent to the initial inlets thereof, constructed to discharge the heated air transversely of said zone, each of said cooling zones being provided with a longitudinal series of air inlets communicating with the atmosphere, and a longitudinal series of air outlets and communicating passages connecting the air outlets of each cooling zone respectively with the initial air inlets of the adjacent preheating zone, controlling dampers for independently regulating the amount of air in different longitudinal portions of each cooling zone, and separate controlling dampers for independently regulating the heated air admitted through said initial inlets of each preheating zone, a longitudinal series of direct firing furnaces for each firing zone, independently operable means for controlling the furnaces of each series to maintain a predetermined rising heat curve from the preheating zone to the cooling zone thereof, and means for withdrawing the products of combustion from each firing zone to prevent end flow thereof into the communicating preheating and cooling zones.

30. A tunnel kiln provided with parallel tunnels, each comprising aligned and directly communicating preheating, firing and cooling zones and goods conveying means in said tunnels movable in opposite direction successively through the zones thereof, each of said preheating zones being provided with a longitudinal series of initial air inlets at one side of and adjacent to the lower portion of the goods space, and a longitudinal series of outlets for the air and gas and vapors of preheating, a longitudinal series of fans in each preheating zone adjacent to the initial inlets thereof, constructed to discharge the heated air transversely of said zone, each of said cooling zones being provided with a longitudinal series of air inlets communicating with the atmosphere, and a longitudinal series of air outlets and communicating passages connecting the air outlets of each cooling zone respectively with the initial air inlets of the adjacent preheating zone, each cooling zone being provided with a longitudinal series of dampers for controlling the amount of cooling air in different portions longitudinally thereof to maintain the desired predetermined cooling curve, and each preheating zone being provided with a separate series of dampers for regulating the amount of heated air admitted through said initial inlets to maintain a predetermined rising heat curve therein, a series of direct firing furnaces for each of said firing zones, and means for withdrawing the products of combustion from each of said firing zones to prevent end flow thereof into the communicating preheating and cooling zones.

31. A tunnel kiln provided with parallel tunnels, each comprising aligned and directly communicating preheating, firing and cooling zones and goods conveying means in said tunnels movable in opposite directions successively through the zones thereof, each of said preheating zones being provided with a longitudinal series of initial air inlets at one side of and adjacent to the lower portion of the goods space, and a longitudinal series of outlets for the air and gas and vapors of preheating, a longitudinal series of fans in each preheating zone adjacent to the initial inlets thereof, constructed to discharge the heated air transversely of said zone, each of said cooling zones being provided with a longitudinal series of air inlets communicating with the atmosphere, and a longitudinal series of air outlets and communicating passages connecting the air outlets of each cooling zone respectively with the initial air inlets of the adjacent preheating zone, each cooling zone being provided with a longitudinal series of dampers for controlling the amount of cooling air in different portions longitudinally thereof to maintain the desired predetermined cooling curve, and each preheating zone being provided with a separate series of dampers for regulating the amount of heated air admitted through said initial inlets to maintain a predetermined rising heat curve therein, the fans in each of said preheating zones being constructed to positively withdraw heated air from the adjacent cooling zone through said initial inlets, a longitudinal series of direct firing furnaces for each firing zone, and means located adjacent to each furnace for withdrawing the products of combustion thereof from the firing zone to prevent end flow of said products of combustion into the communicating preheating and cooling zone.

32. A tunnel kiln provided with aligned preheating, firing and cooling zones and goods conveying means movable successively therethrough, a series of fans arranged longitudinally of the preheating zone adjacent to the lower portion and at one side of the goods space therein, said preheating zone being provided with initial air inlets adjacent to said fans, said cooling zone being provided with a longitudinal series of air inlets communicating with the atmosphere, and a longitudinal series of outlets for heated air, independently operable means located at different points longitudinally of the cooling zone for regulating the amount of cooling air in different portions thereof, a communicating passage extending longitudinally of the kiln for connecting said outlets of the cooling zone with the initial inlets of the preheating zone, and independent means for controlling said initial inlets.

33. A tunnel kiln provided with aligned preheating, firing and cooling zones and goods conveying means movable successively therethrough, a series of fans arranged longitudinally of the preheating zone adjacent to the lower portion and at one side of the goods space therein, said preheating zone being provided with initial air inlets adjacent to said fans, said cooling zone being provided with a longitudinal series of air inlets communicating with the atmosphere, and a longitudinal series of outlets for heated air, independently operable means located at different points longitudinally of the cooling zone for regulating the amount of cooling air in different portions thereof, a communicating passage extending longitudinally of the kiln for connecting said outlets of the cooling zone with the initial inlets of the preheating zone, and independent means for controlling said initial inlets, said fans being so located and constructed to withdraw the heated air from the outlets of the cooling zone through the inlets of the preheating zone and discharge it transversely of the preheating zone, said fans being so constructed as to have a greater capacity than is required for suction purpose for effecting a recirculation of said heated air entirely within the main chamber of the preheating zone.

34. A tunnel kiln comprising a main chamber through which the goods to be treated are moved, means situated approximately at the central portion of the length of said chamber for developing a high temperature therein, gas propelling mechanisms located within the kiln and associated with the portion of said chamber forward of the portion of high temperature, and constructed and arranged to effect a circulation transversely of the chamber, and means for continuously supplying fresh air for circulation by said propelling mechanisms.

35. A tunnel kiln comprising a main chamber through which the goods to be treated are moved, means situated approximately at the central portion of the length of said chamber for developing a high temperature therein, gas propelling mechanisms located within the kiln and associated with the portion of said chamber forward of the portion of high temperature, and constructed and arranged to effect a circulation transversely of the chamber in opposite directions across said chamber at different levels, and means for continuously supplying fresh air for circulation by said propelling mechanisms.

36. A tunnel kiln comprising a main chamber through which the goods to be treated are moved, means situated approximately at the central portion of the length of said chamber for developing a high temperature therein, gas propelling mechanisms located within the kiln and associated with the portion of said chamber forward of the portion of high temperature, and constructed and arranged to effect a circulation transversely of the chamber, said propelling mechanisms being located along one side of said chamber adjacent to the lower portion of the goods space thereof, and thereby creating return currents in the opposite direction across the upper portion of the goods space, the circulation effected by said propelling mechanism being entirely within said chamber, and means for continuously admitting fresh air for circulation by said propelling mechanisms.

37. A tunnel kiln comprising a main chamber through which the goods to be treated are moved, means situated approximately at the central portion of the length of said chamber for developing a high temperature therein, gas propelling mechanisms located within the kiln and associated with the portion of said chamber forward of the portion of high temperature, and constructed and arranged to effect a circulation transversely of the chamber, said propelling mechanisms being located along one side of said chamber adjacent to the lower portion of the goods space thereof, and thereby creating return currents in the opposite direction across the upper portion of the goods space, the circulation effected by said propelling mechanism being entirely within said chamber, and inlets for fresh air adjacent to certain of said propelling mechanisms.

38. In a twin tunnel kiln, the combination with a firing chamber, located centrally of the length of the kiln, unitary end tunnel sections extending longitudinally from each end of the firing chamber and forming combined cooling and preheating chambers, and parallel goods conveying means movable in opposite directions, each of which passes through all of said chambers, of gas propelling mechanisms located within each of said end sections and constructed and arranged to effect a circulation transversely of the combined cooling and preheating chamber therein.

39. In a twin tunnel kiln, the combination with a firing chamber, located centrally of the length of the kiln, unitary end tunnel sections extending longitudinally from each end of the firing chamber and forming combined cooling and preheating chambers, and parallel goods conveying means movable in opposite directions, each of which passes through all of said chambers, of gas propelling mechanisms located within each of said end sections and constructed and arranged to effect a circulation transversely of the combined cooling and preheating chamber therein, and means for continuously admitting fresh air to each of said combined cooling and preheating chambers to secure the rapid oxidizing and water-smoking of the ware to be preheated.

40. In a twin tunnel kiln, the combination with a firing chamber, located centrally of the length of the kiln, unitary end tunnel sections extending longitudinally from each end of the firing chamber and forming combined cooling and preheating chambers, and parallel goods conveying means movable in opposite directions, each of which passes through all of said chambers, each of said combined cooling and preheating chambers being provided within and adjacent to one side of the same with a longitudinal series of fans discharging horizontally across the goods spaces for cooling and preheating ware, adjacent to the lower portion of said chamber.

41. In a twin tunnel kiln, the combination with a firing chamber, located centrally of the length of the kiln, unitary end tunnel sections extending longitudinally from each end of the firing chamber and forming combined cooling and preheating chambers, and parallel goods conveying means movable in opposite directions, each of which passes through all of said chambers, each of said combined cooling and preheating chambers being provided within and adjacent to one side of the same with a longitudinal series of fans discharging horizontally across the goods spaces for cooling and preheating ware, adjacent to the lower portion of said chamber, and means for admitting fresh air to said chamber at different points longitudinally thereof.

42. In a twin tunnel kiln, the combination with a firing chamber, located centrally of the length of the kiln, unitary end tunnel sections extending longitudinally from each end of the firing chamber and forming combined cooling and preheating chambers, and parallel goods conveying means movable in opposite directions, each of which passes through all of said chambers, each of said combined cooling and preheating chambers being provided within and adjacent to one side of the same with a longitudinal series of fans discharging horizontally across the goods spaces for cooling and preheating ware, adjacent to the lower portion of said chamber, means for admitting fresh air at different points longitudinally thereof, and a longitudinal series of eduction ports for withdrawing said air together with the gases and vapors of preheating.

43. In a twin tunnel kiln, the combination with a firing chamber, located centrally of the length of the kiln, unitary end tunnel sections extending longitudinally from each end of the firing chamber and forming combined cooling and preheating chambers, and parallel goods conveying means movable in opposite directions, each of which passes through all of said chambers, each of said combined cooling and preheating chambers being provided within and adjacent to one side of the same with a longitudinal series of fans discharging horizontally across the goods spaces for cooling and preheating ware, adjacent to the lower portion of said chamber, a longitudinal series of inlets for fresh air at the side of said chamber, adjacent to said fans, and a longitudinal series of eduction ports a distance from said inlet ports for withdrawing the said air together with the gases and vapors of preheating.

44. In a twin tunnel kiln, the combination with a firing chamber, located centrally of the length of the kiln, unitary end tunnel sections extending longitudinally from each end of the firing chamber and forming combined cooling and preheating chambers, and parallel goods conveying means movable in opposite directions, each of which passes through all of said chambers, each of said combined cooling and preheating chambers being provided within the same, and adjacent to the goods space for the goods to be preheated with a longitudinal series of fans discharging horizontally across the lower portions of the goods spaces for both the cooling and preheating ware, a longitudinal series of inlets for fresh air on the side of said chamber adjacent to said fans, and a longitudinal series of eduction ports at the opposite side of said chamber for withdrawing said air together with the gases and vapors of preheating.

In testimony whereof I affix my signature.

WILLIAM LEE HANLEY, Jr.